US012675811B1

(12) United States Patent
Lynes et al.

(10) Patent No.: US 12,675,811 B1
(45) Date of Patent: Jul. 7, 2026

(54) AUTOMATED ITEM ATTRIBUTION AND CONDITION DETECTION SYSTEM

(71) Applicant: The RealReal, Inc., San Francisco, CA (US)

(72) Inventors: Beatrice Lynes, San Francisco, CA (US); Agostina Juliana Larrazabal, Parana (AR); Fabrizio Albertoni, Montevideo (UY); Marcos Toscano, Montevideo (UY); Soledad Rivas, Montevideo (UY); Tomas Alori Sorhuet, Montevideo (UY); Sebastian Sosa, Ciudad de la Costa (UY); Jordi Adame, San Francisco, CA (US); Esteban Bordon, Concord, CA (US); Jordan Nishina, San Francisco, CA (US); Jon Kent, Los Angeles, CA (US)

(73) Assignee: The RealReal, Inc., San Francisco, CA (US)

( * ) Notice: Subject to any disclaimer, the term of this patent is extended or adjusted under 35 U.S.C. 154(b) by 88 days.

(21) Appl. No.: 18/617,577

(22) Filed: Mar. 26, 2024

(51) Int. Cl.
 *G06Q 30/0601* (2023.01)
 *G06V 10/70* (2022.01)

(52) U.S. Cl.
 CPC ......... *G06Q 30/0627* (2013.01); *G06V 10/70* (2022.01)

(58) Field of Classification Search
 None
 See application file for complete search history.

(56) References Cited

U.S. PATENT DOCUMENTS

| | | | | |
|---|---|---|---|---|
| 12,074,895 | B1 * | 8/2024 | Shen | H04L 63/101 |
| 2020/0320769 | A1 * | 10/2020 | Chen | G06F 18/214 |
| 2021/0073972 | A1 * | 3/2021 | Wu | G06N 3/08 |
| 2022/0414735 | A1 * | 12/2022 | Rubinson | G06N 20/00 |
| 2025/0029206 | A1 * | 1/2025 | Ranzinger | G06V 10/82 |
| 2025/0285718 | A1 * | 9/2025 | Planche | G16H 15/00 |

OTHER PUBLICATIONS

Vaswani et al., *Attention Is All You Need*, Aug. 2, 2023, pp. 1-15.
Zhu et al., *MINIGPT-4: Enhancing Vision-Language Understanding with Advanced Large Language Models*, Oct. 2, 2023, pp. 1-15.

* cited by examiner

*Primary Examiner* — Kito R Robinson
(74) *Attorney, Agent, or Firm* — Adibi IP Group, PC; Amir V. Adibi; Andrew C. Palmer

(57) ABSTRACT
An electronic commerce platform application server comprises an attribute generator application, condition detector application, and a machine learning system. During operation, a device collects sensor data, such as images and/or 3D point clouds, of an item to add to inventory. The attribute generator and condition detector applications receive the sensor data from the device over a network. The attribute generator and condition detector applications process the sensor data using the ML system and predict attributes and condition of the item. In one embodiment, the ML system includes a vision encoder and one or more large language models (LLMs) prompted to generate a description of the item from an image. The ML system also includes one or more neural networks trained to detect condition information, including condition description, bounding boxes identifying defects, high wear regions, and condition classification categories. The ML systems provide scalable and efficient addition of new inventory.

11 Claims, 17 Drawing Sheets

OPERATION OF CONDITION DETECTOR APPLICATION

ELECTRONIC COMMERCE PLATFORM SYSTEM

DETAILED USER DEVICE AND ELECTRONIC
COMMERCE APPLICATION SERVER

MACHINE LEARNING SYSTEM

ATTRIBUTE GENERATOR MODEL

TRANSFORMER ARCHITECTURE OF
LARGE LANGUAGE MODEL

EXAMPLE PROMPTS

IMAGE
85

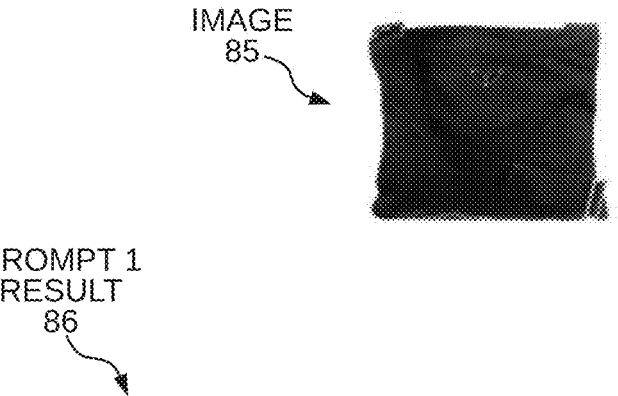

PROMPT 1
RESULT
86

The Prada satchel is a black nylon bag with a silver logo on the front. It has a long strap that can be worn over the shoulder or carried in the hand. The bag has a zipper closure and a small interior pocket for storing small items.

PROMPT 2
RESULT
87

|  | PREDICTION |
|---|---|
| PRIMARY MATERIAL | nylon |
| PATTERN | solid |
| HANDBAGS-STRAPS | single-adjustable-shoulder-strap |
| HANDBAGS-HANDLES | NaN |
| FEET | handbags-no-feet |
| COLOR | black |
| HARDWARE | silver-tone |

EXAMPLE OF PREDICTED ATTRIBUTES
FIG. 7

IMAGE
88

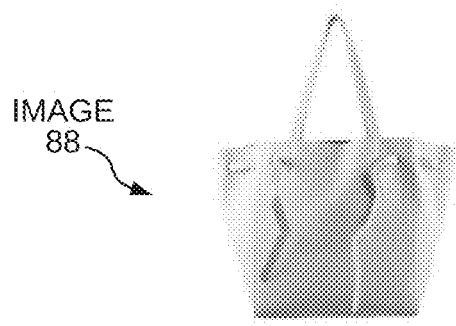

PROMPT 1
RESULT
89

The Celine tote is made of white leather and has a long shoulder strap. The front of the bag has a zipper closure and the back has a flap with a magnetic snap closure. The inside of the bag is lined with a light colored fabric and has two open pockets, one with a zipper and the other with a magnetic snap closure.

PROMPT 2
RESULT
90

|  | PREDICTION |
|---|---|
| PRIMARY MATERIAL | leather |
| PATTERN | solid |
| HANDBAGS-STRAPS | single-shoulder-strap |
| HANDBAGS-HANDLES | NaN |
| FEET | handbags-no-feet |
| COLOR | white |
| HARDWARE | none |

EXAMPLE OF PREDICTED ATTRIBUTES
FIG. 8

IMAGE
91

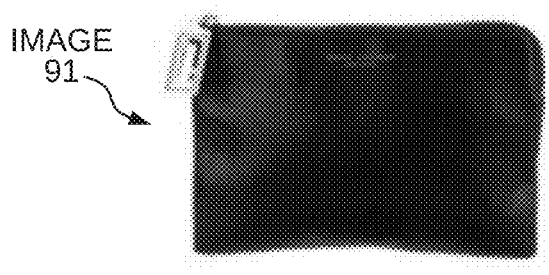

PROMPT 1
RESULT
92

The Marc Jacobs clutch is made of black leather and has a gold-tone logo on the front. It has a chain shoulder strap and a magnetic snap closure.

PROMPT 2
RESULT
93

|  | PREDICTION |
| --- | --- |
| PRIMARY MATERIAL | leather |
| PATTERN | solid |
| HANDBAGS-STRAPS | chain-link-shoulder-strap |
| HANDBAGS-HANDLES | NaN |
| FEET | handbags-no-feet |
| COLOR | black |
| HARDWARE | gold-tone |

EXAMPLE OF PREDICTED ATTRIBUTES
FIG. 9

OPERATION OF ATTRIBUTE GENERATOR APPLICATION

CONDITION DETECTION MODEL

TRAIN ML MODEL TO PREDICT CONDITION
INFORMATION OF ITEM

1300

EXAMPLE OF IMAGE DATA

EXAMPLE OF LABELED IMAGE DATA

ANOTHER EXAMPLE OF LABELED IMAGE DATA

1600

START

1601 — RECEIVE IMAGE OF ITEM

1602 — PREDICT CONDITION OF ITEM USING ML SYSTEM

1603 — PREDICT BOUNDING BOX OF DEFECT(S) USING ML SYSTEM

1604 — STORE AND PRESENT CONDITION INFORMATION

END

OPERATION OF CONDITION DETECTOR APPLICATION

OPERATION OF CONDITION DETECTOR APPLICATION

AUTOMATED ITEM ATTRIBUTION AND CONDITION DETECTION SYSTEM

TECHNICAL FIELD

The present invention relates generally to online commerce systems, and more specifically, to artificial intelligence electronic commerce systems.

BACKGROUND INFORMATION

Large retail providers often offer many types of items for sale and carry a significant variety of inventory. Retail providers typically sell items using online commerce platforms. These online commerce platforms provide customers with the functionality to purchase items from retailers through websites or through mobile applications. The customer accesses online commerce platforms via their desktop or mobile internet browsers or via a mobile application downloaded and installed on their mobile device. After selecting an item of interest to view, the customer is presented with a Product Description Page (PDP). The PDP provides the customer with information in connection with the selected item of interest, including price information and a description of the item. The customer is able to purchase the selected item via the PDP.

SUMMARY

An electronic commerce platform application server includes an attribute generator application, condition detector application, and a machine learning system. During operation, a device, such as a mobile phone, VR headset, virtual assistant, laptop, or computing device collects sensor data of an item to be added to the inventory of an electronic commerce platform. The item is apparel, clothing, accessory, or any other product available for resale by the electronic commerce platform. The device has an image sensor, such as a high resolution camera of at least twelve megapixels, and/or a remote sensing sensor, such as a LiDAR (Light Detection and Ranging) sensor. The device collects the sensor data of the item and communicates the sensor data over a network to the electronic commerce platform application server for further processing by the attribute generator application and condition detector application. The ML systems provide scalable and efficient techniques for adding new items to inventory with attributes and condition information.

The attribute generator application receives the sensor data from the device over a network. The attribute generator application processes the sensor data using the ML system and predicts attributes of the item based on the sensor data. In one embodiment, the ML system includes a vision encoder and one or more large language models (LLMs). The LLMs are prompted to generate a description of the item from an image and provide structured attribute information. For example, a first LLM is prompted to generate a description of the item, and a second LLM is prompted to generate a structured list of attributes from the description of the item generated by the first LLM. The attribute generator is able to generate descriptions for items that are new to the platform and for which no similar items exist. In other embodiments, before the LLMs are used to predict attributes, images of the received item are compared to stored images of prior stored items. Attributes for matching items are used to populate attributes of the new item. For missing attributes or for new items that have no matching similar items, the LLMs are used to identify missing or unknown attributes.

The condition detector application also receives the sensor data from the device over a network. The condition detector application processes the sensor data using the ML system and predicts condition information of the item from the sensor data. In one embodiment, the ML system includes one or more neural networks trained to detect condition information. The condition information includes a condition description, bounding boxes identifying defects, high wear regions, and condition classification categories. In various embodiments, users are instructed to provide additional images of high wear regions so that the electronic commerce platform can generate more precise pricing estimates and provide full wear information to potential buyers thereby reducing return rates.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIGS. 7-9 show examples of predicted attributes.

DETAILED DESCRIPTION

Reference will now be made in detail to some embodiments of the invention, examples of which are illustrated in the accompanying drawings.

Figure 1:
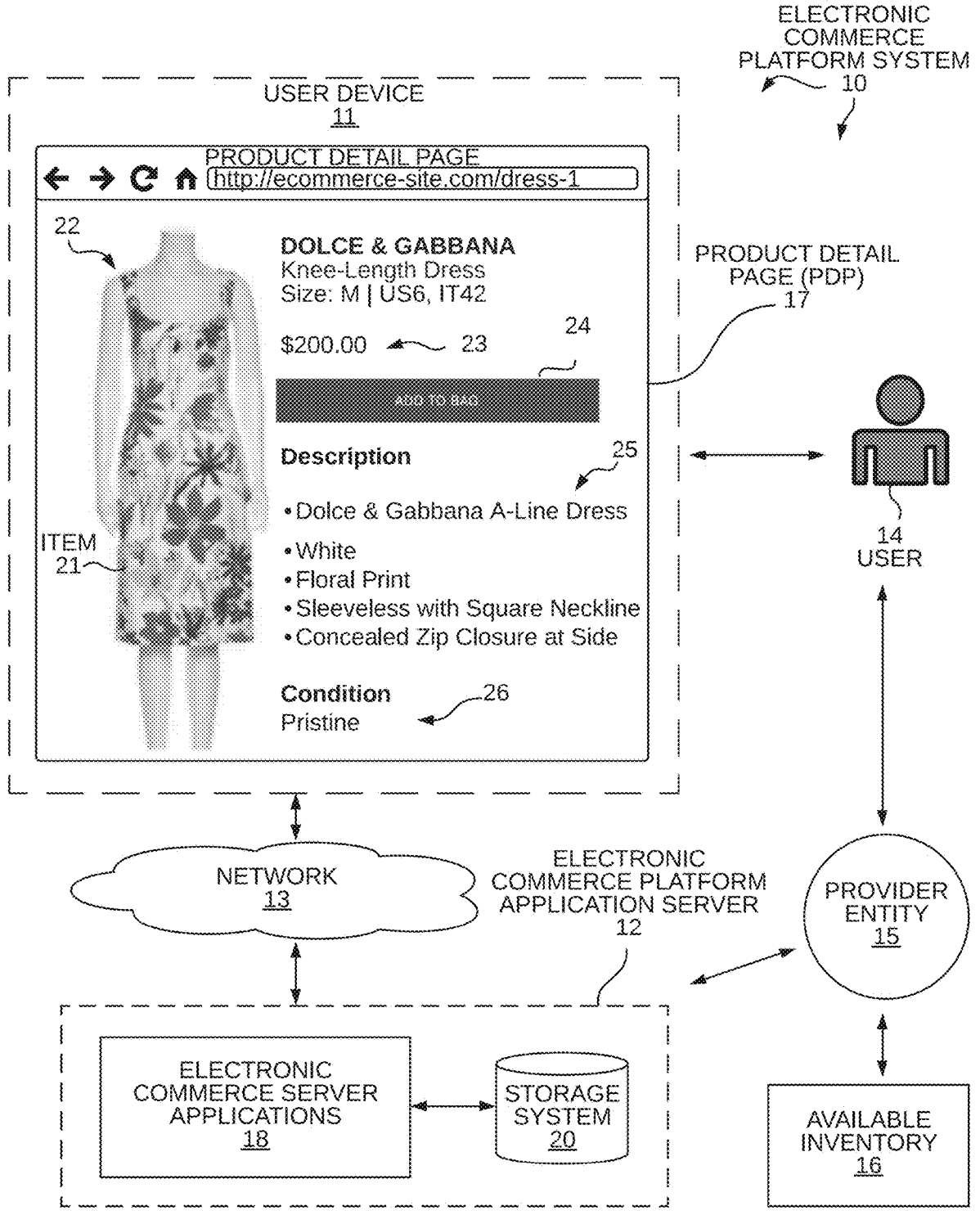
FIG. 1 is a diagram of an electronic commerce platform system in accordance with one embodiment.

FIG. 1 is a diagram of an electronic commerce platform system 10 in accordance with one embodiment. The electronic commerce platform system 10 includes a user device 11 and an electronic commerce platform application server 12. The user device 11 communicates with the electronic commerce platform application server 12 over a network 13 via a wired and/or wireless connection. The electronic commerce platform application server 12 provides an electronic commerce platform that allows a customer (user) 14 to view and purchase items provided by a provider entity 15.

The user device 11 is a mobile device, tablet, desktop computer, VR/AR headset, virtual assistant device, or any other network-enabled device suitable to access the electronic commerce platform. The provider entity 15 is an entity that manages and sells inventory 16, such as an online retailer or online consignor.

The provider entity 15 presents items in inventory 16 via product detail pages (PDPs) provided by the electronic commerce platform application server 12. The product detail pages are presented via a mobile application or internet browser operating on the user device 11. Reference numeral 17 identifies one exemplary PDP. The user 14 views PDP 17 via a display of the user device 11.

The electronic commerce platform application server 12 comprises one or more electronic commerce platform server applications 18 and a storage system 19. The electronic commerce platform application server 12 includes additional components and hardware (not shown) that provide product detail pages, such as PDP 17, and allow provider entity 15 to manage inventory 16 and other functionality associated with offering items for sale. In one embodiment, the electronic commerce platform server applications 18 and the storage system 20 operate across a distributed network. For example, the electronic commerce platform server applications 18 are realized as a compute engine virtual machine operating on Google Cloud® infrastructure and the storage system 20 is realized as an Elasticsearch Service operating on the Google Cloud® infrastructure.

In this example, the user 14 selects an item 21 of interest to view. The selected item 21 is presented on the product detail page (PDP) 17. The PDP 17 presents an image 22 of the selected item 21, price information 23, a purchase button 24, a description 25 of attribute information, and condition information 26. In this example, the selected item 21 is a "FLORAL PRINT MIDI LENGTH DRESS" in "Pristine" condition that costs "$200.00" and is available for purchase via the "Add to Bag" button 24 presented on the PDP 17. After the purchase is completed, the provider entity 15 ships the physical item represented by selected item 17 to the user 14 and the storage system 20 is updated to reflect the change in available inventory 16.

In one embodiment, the provider entity 15 is a single SKU provider. Single SKU providers have unique problems that are not experienced by conventional retailers. A single SKU provider does not have many items having the same SKU. Since each item is unique, a single SKU provider must dynamically process a significantly large and evolving inventory. Once an item is sold, it is no longer in inventory. New items are also added to the inventory having SKUs that are new to the single SKU provider and never previously offered by the single SKU provider. Despite being new, the provider entity 15 needs to efficiently determine attributes of new items to describe the new items to potential buyers. To minimize the risk of returns, the provider entity 15 must also determine the condition of items to properly inform potential buyers of any defects or issues with items in inventory 16. In addition, attribute and condition information assist the provider entity 15 in appropriately pricing the item for sale.

Figure 2:
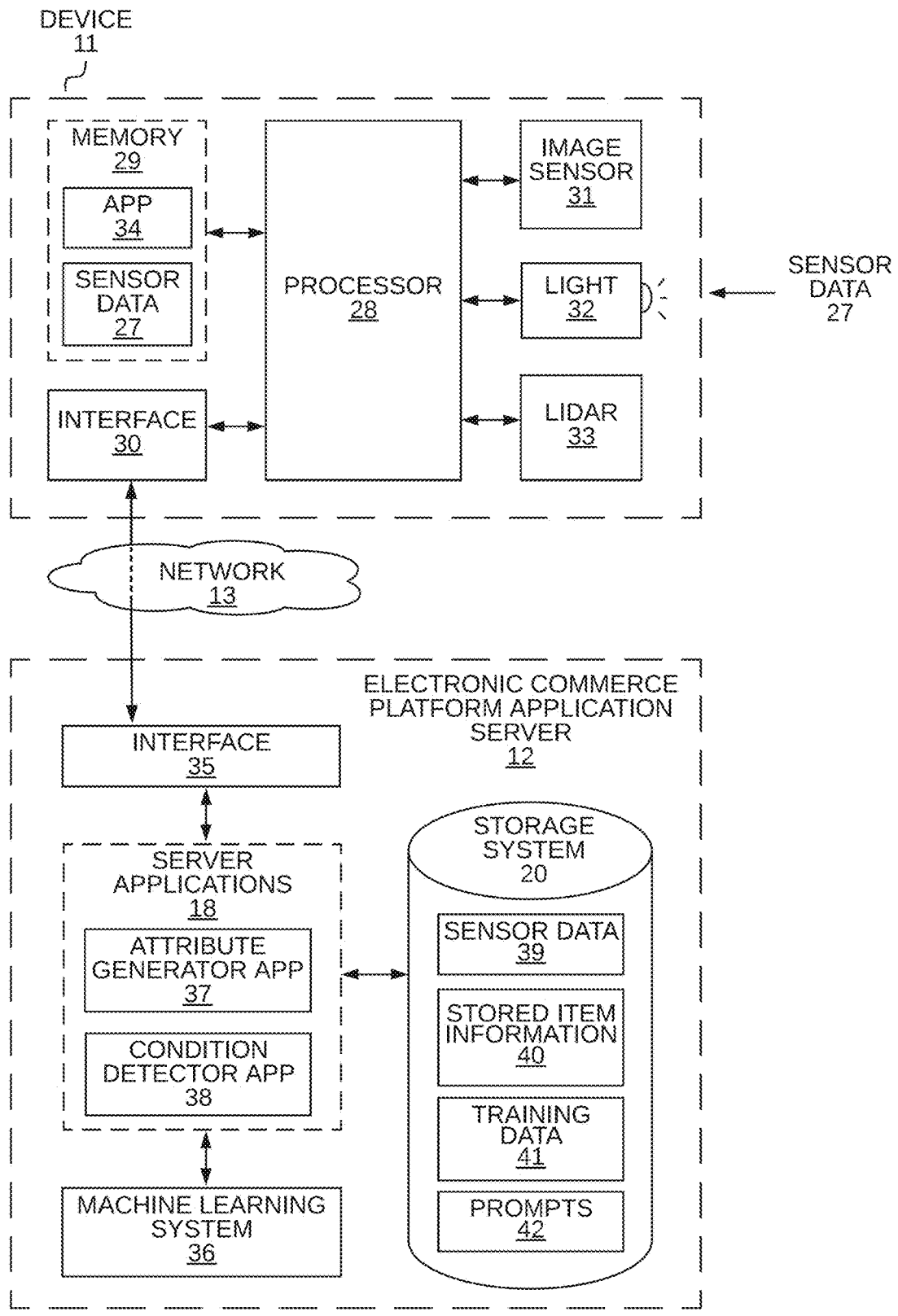
FIG. 2 is a detailed diagram of a user device and an electronic commerce application server in accordance with one embodiment.

FIG. 2 is a detailed diagram of the user device 11 and the electronic commerce platform application server 12 in accordance with one embodiment. The electronic commerce platform application server 12 receives sensor data 27 collected via the device 11 and uses the sensor data to predict attributes and condition of items to be added to inventory 16 and offered for sale via the electronic commerce platform.

The device 11 comprises a controller 28, memory 29, network interface 30, image sensor 31, light 32, and remote sensing device 33. The image sensor 31 is a high resolution camera having a resolution of at least twelve megapixels and operable to obtain images of appropriate quality for purposes of predicting attributes and condition of items. The remote sensing device 33 is a LiDAR (Light Detection and Ranging) sensor operable to obtain point cloud or depth map data usable to predict attributes and condition of items.

Memory 29 is a computer-readable medium that includes any kind of computer memory such as floppy disks, conventional hard disks, CD-ROMS, Flash ROMS, non-volatile ROM, RAM, and non-volatile memory. The interface 30 comprises any suitable hardware/software capable of interfacing with external devices, such as a network link or a physical communication bus that allows wired or wireless communications between external devices and the application server 12.

The processor 28 runs an application 45 stored in memory 29. The application 34 includes computer readable instructions, such as a mobile application or web browser that is configured to communicate with application server 12. The application 34 causes the processor 28 to control image sensor 31 and remote sensing device 33 to collect and store sensor data 27 and to control the light 32 to provide desired lighting. The sensor data 27 includes images via the image sensor 31 and remote sensing information obtained via the LiDAR sensor 33. The processor 28 communicates the sensor data 27 to the server applications 18 running on application server 12 via the interface 30.

It is appreciated that other types of devices may be used to process, analyze, and gather sensor data for new items. For additional information on instrumentation used to obtain sensor data, including how to construct and operate other sensing equipment and how to extract useful information from sensor data, see: (1) U.S. patent application Ser. No. 18/240,590, "Automated Authentication System For Production Environments," filed on Aug. 31, 2023, by Dombrowski et al., (2) U.S. patent application Ser. No. 18/478,877, "Automated System Having Vertical And Horizontal Stacking Of Photo Studios For Efficient Image Capture," filed on Sep. 29, 2023, by Cheema et al., and (3) U.S. patent application Ser. No. 18/398,080, "Automated Extraction of Product Data From Tags," filed on Dec. 27, 2023, by Cheema et al. (the entire subject matter of the foregoing patent documents is hereby expressly incorporated by reference).

The application server 12 comprises an interface 35, one or more server applications 18, a machine learning system 36, and a storage system 20. The application server 12 includes additional components and hardware (not shown) that provide product detail pages and allow provider entity 15 to manage inventory 16, authenticate new items, price new items, and other functionality associated with offering items for sale. The interface 35 comprises any suitable hardware/software capable of interfacing with external devices, such as a network link or a physical communication bus that allows wired or wireless communications between external devices and the application server 12.

In this embodiment, the one or more server applications 18 include an attribute generator application 37 and a condition detector application 38. The attribute generator application 37 provides a scalable and automated way of detecting attributes of new items to be added to inventory 16 of the electronic commerce system 10. The attribute generator application 37 uses machine learning system 36 to detect attributes of items from sensor data 27 collected by device 11. The condition detector application 38 provides a scalable and automated way of predicting the condition of new items to be added to inventory 16 of the electronic commerce system 10. The condition detector application 38 uses machine learning system 36 to detect the condition of new items via sensor data 27 collected by device 11.

The storage system 20 is any suitable hardware that stores computer readable information accessible via server applications 18. The storage system 20 includes one or more different types of databases, including relational database systems and document-oriented database systems. The storage system 20 stores information involved in operation of server applications 18 in addition to other information involved in operation of the electronic commerce system 10. The storage system 20 stores sensor data 39, stored item information 40, training data 41, and prompt information 42.

The sensor data 39 includes sensor 27, in addition to other aggregated sensor data collected over time and via other instruments to improve machine learning system 36 and quality control processes. The stored item information 40 includes attributes of items, such as brand/source, material, hardware, color, pattern, size, taxon/type, and other descriptive item information of current and past inventory. The training data 41 includes labeled and unlabeled data used in training and improving machine learning system 36. The prompt information 42 is used as inputs to large language models (LLMs) of the machine learning system 36 as described in further detail below.

During operation, sensor data 27 is collected by the device 11. The device 11 communicates collected sensor data 27 over network 13 to the attribute generator application 37 and the condition detector application 38 via interfaces 30 and 35. The attribute generator application 37 uses machine learning system 36 to process and analyze sensor data 27 thereby predicting attributes of a new item to be added to inventory 16. The condition detector application 38 uses machine learning system 36 to process and analyze sensor data 27 thereby predicting the condition of a new item to be added to inventory 16.

Figure 3:
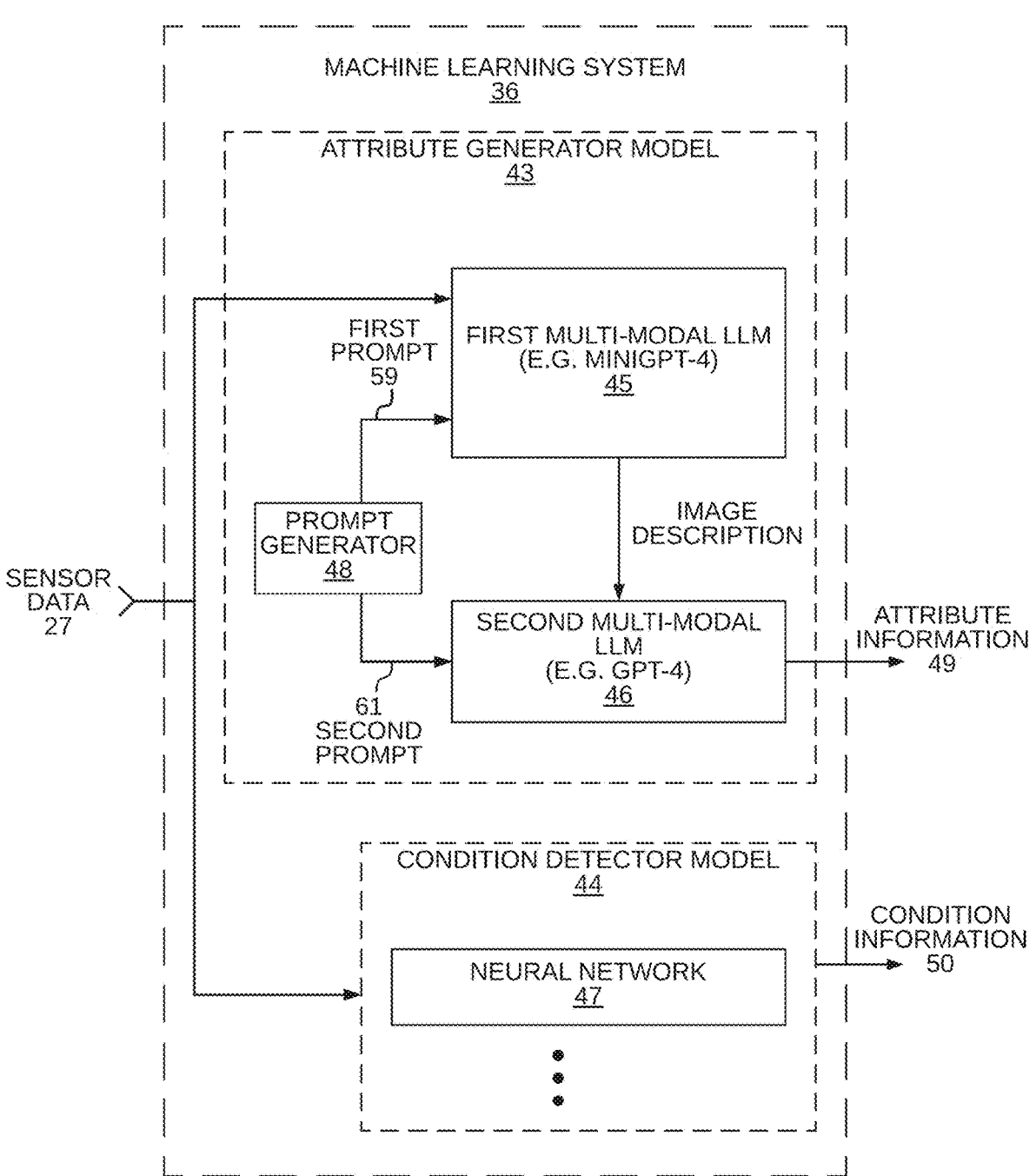
FIG. 3 is a detailed diagram of a machine learning system in accordance with one embodiment.

FIG. 3 is a block diagram of the machine learning system 36 in accordance with one embodiment. The machine learning system 36 comprises an attribute generator model 43 and a condition detector model 44. In this example, the attribute generator model 43 comprises a first multi-modal LLM 45, a second multi-modal LLM 46, and a prompt generator 48. The condition detector model 44 comprises at least one neural network 47. The attribute generator model 43 receives sensor data 27 and outputs attribute information 49. The condition detector model 44 receives sensor data 27 and outputs condition information 50. In other embodiments, the number and types of neural networks in attribute generator model 43 and condition detector model 44 may vary. In yet other embodiments, non-neural network-based techniques are employed to predict attributes and condition of new items, such as support vector machines (SVM), K-Nearest Neighbors (KNN), or other machine learning algorithms.

Figure 4:
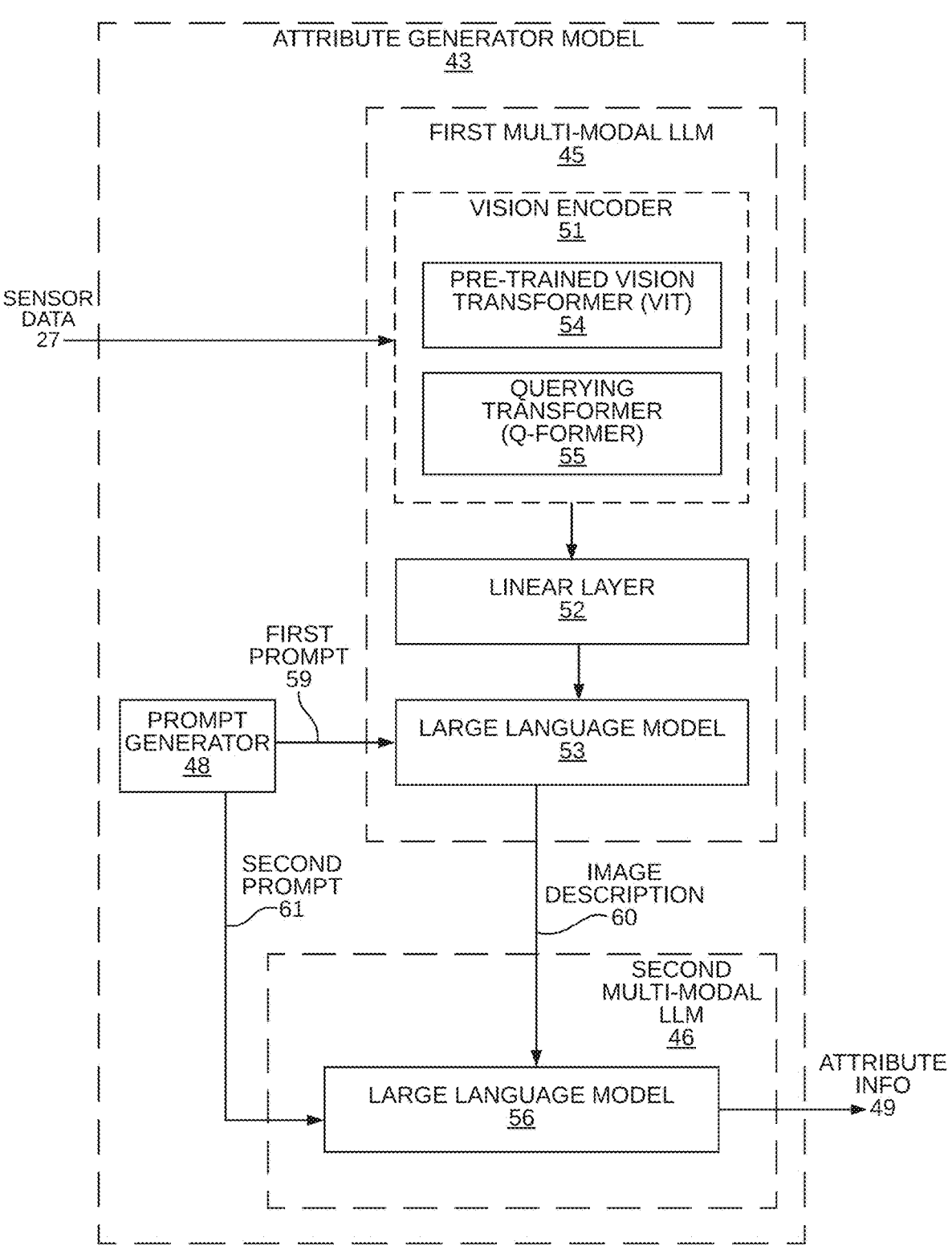
FIG. 4 is a detailed diagram of an attribute generator model in accordance with one embodiment.

FIG. 4 is a detailed diagram of an attribute generator model 43 that includes the first multi-modal LLM 45 and the second multi-modal LLM 46. The first multi-modal LLM 45 comprises a vision encoder 51, a single linear projection layer 52, and a large language model (LLM) 53. The vision encoder 51 comprises a pre-trained vision transformer (ViT) 54 and a querying transformer (Q-Former) 55. The second multi-modal LLM 46 comprises a large language model (LLM) 56. In one embodiment, the first multi-modal LLM 45 is realized as a MiniGPT-4 LLM available from minigpt-4.github.io and the second multi-modal LLM 46 is realized as a GPT-4 LLM available from openai.com/gpt-4.

In operation, the first multi-modal LLM 45 receives sensor data 27 onto the vision encoder 51. An output 57 of the vision encoder is supplied to projection layer 52. An output 58 of the projection layer 52 is supplied to the LLM 53. The LLM 53 receives the output 57 and a first prompt 59 and outputs an image description 60. In this example, the first prompt 59 is "DESCRIBE ITEM IN DETAIL" text. Next, the large language model 56 of the second multi-modal LLM 46 receives the image description 60 and a second prompt 61 and outputs attribute information 49. In this example, the second prompt is "GIVEN A PRODUCT DESCRIPTION, GENERATE A LIST OF PRODUCT ATTRIBUTES INCLUDING PRIMARY-MATERIAL, HARDWARE, COLOR, PATTERN, STRAPS, AND HANDLES" text.

Figure 5:
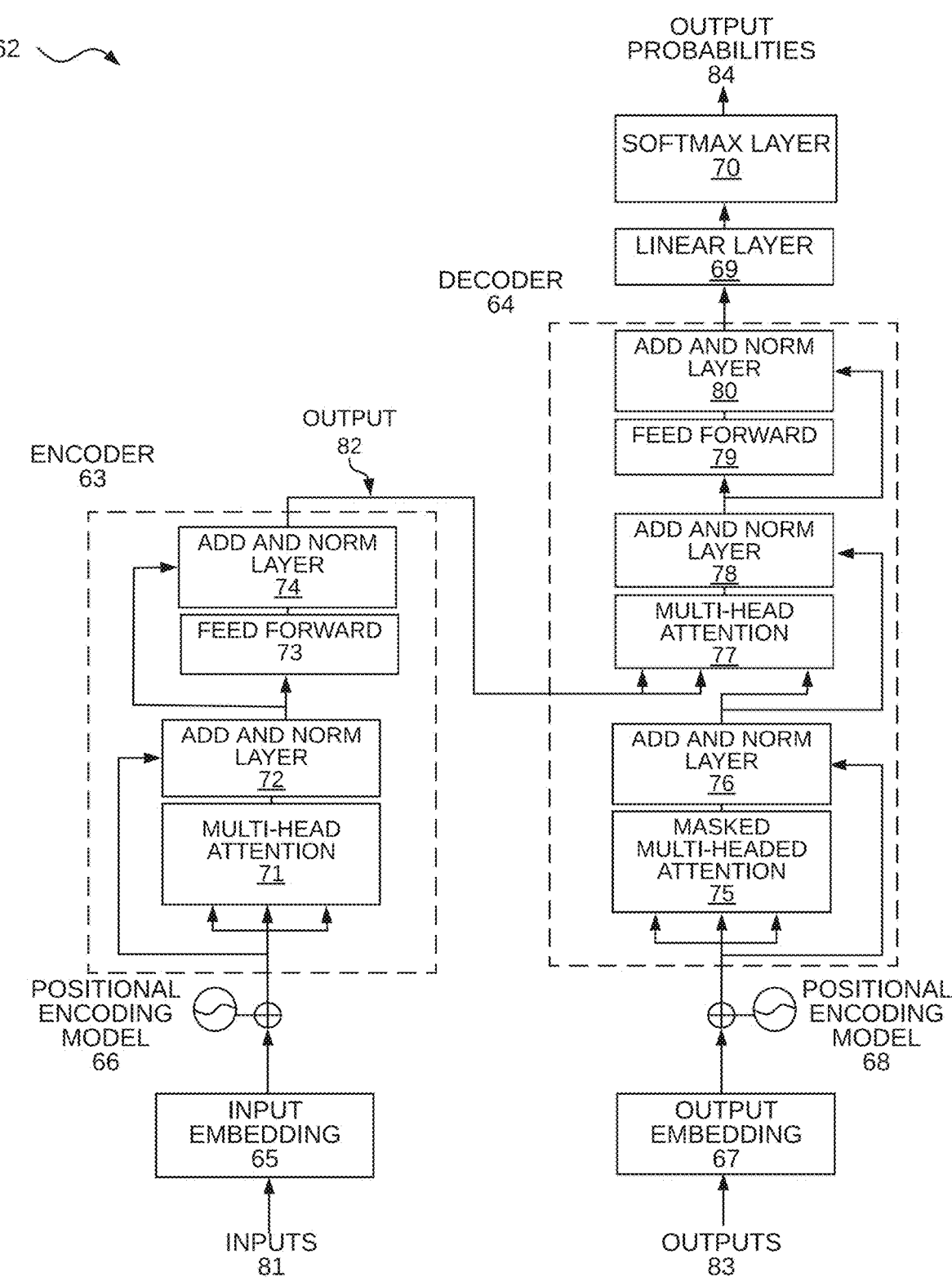
FIG. 5 is a detailed diagram of a transformer architecture of a large language model.

FIG. 5 is a detailed diagram of a transformer architecture 62. The transformer architecture 62 is usable in realizing large language models, such as LLMs 53 and 56. The transformer architecture 62 includes an encoder 63, a decoder 64, input embedding model 65, position encoding model 66, output embedding model 67, position encoding model 68, linear layer 69, and a soft max layer 70. Input embedding model 65 receives inputs 81. Positional embedding model 66 receives the output from input embedding model 65 and outputs to encoder 63. Encoder 63 comprises multi-headed attention 71, add and norm layer 72, feed forward 73, and add and norm layer 74. Output embedding model 67 receives outputs 83. Positional embedding model 68 receives the output from output embedding model 67 and outputs to decoder 64. Decoder 64 comprises masked multi-headed attention 75, add and norm layer 76, multi-headed attention 77, add and norm layer 78, feed forward 79, and add and norm layer 80. Linear layer 69 receives output from add and norm layer 80 and outputs to softmax layer 70. Softmax layer 70 outputs output probabilities 84. In operation, the encoder 63 generates output 81 from received input 82. The decoder 64 generates output 83 and output probabilities 84. Additional information on the structure and operation of the transformer architecture 62, including how to construct and build LLMs that employ the transformer architecture 62, is available at arxiv.org/abs/1706.03762.

Figure 6:
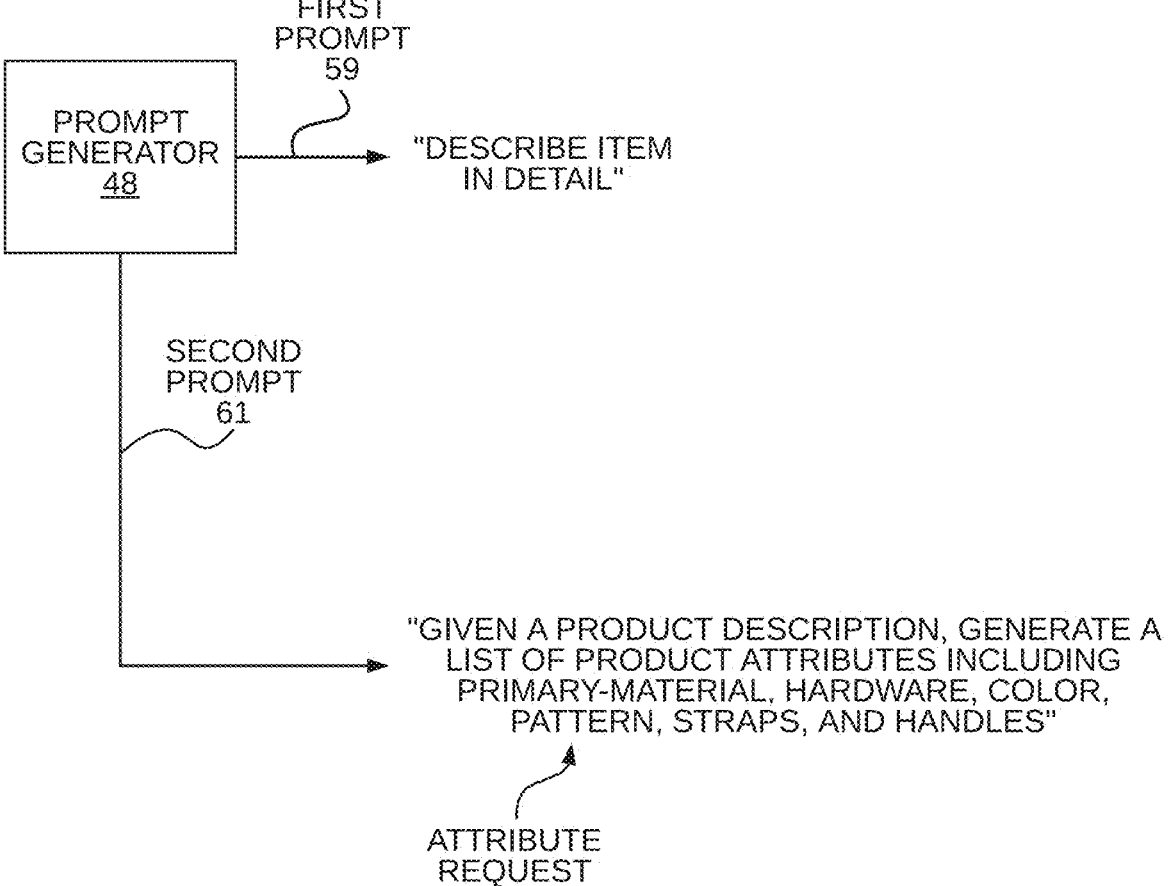
FIG. 6 shows exemplary prompts generated by an embodiment of a prompt generator.

FIG. 6 shows exemplary prompts generated by an embodiment of a prompt generator 48. In one embodiment, the prompt generator 48 generates the first prompt 59 that requests "DESCRIBE ITEM IN DETAIL." The prompt generator 48 also generates a second prompt 61 that requests "GIVE A VALUE FOR EACH ATTRIBUTE." The generated prompts 59 and 61 are input to the large language models 408 and 407 as shown in FIG. 4. It is appreciated that these are examples of prompts and that other prompts may be utilized. In some embodiments, the prompt generator 48 selects prompts 42 that are stored in storage system 20. In other embodiments, the prompt generator 48 dynamically generates prompts. In still other embodiments, the prompt generator 48 dynamically generates prompts using stored information and operator supplied inputs. The electronic commerce platform application server 12 provides a configuration and training portal (not shown) where prompts can be updated, improved, and further configured to improve attribute generation.

FIGS. 7-9 show examples of predicted attribute results for a received image.

FIG. 7 shows the predicted attribute results for the image 85. The first prompt 59 from the prompt generator 48 requests a description of the item. The result of the first prompt 59 is shown as the generated text description 86. The second prompt 61 from the prompt generator 48 requests a value for each attribute. The result of the second prompt 61 is shown as the generated table 87.

FIG. 8 shows the predicted attribute results for the image 88. The first prompt 59 from the prompt generator 48 requests a description of the item. The result of the first prompt 59 is shown as the generated text description 89. The second prompt 61 from the prompt generator 48 requests a value for each attribute. The result of the second prompt 61 is shown as the generated table 90.

FIG. 9 shows the predicted attribute results for the image 91. The first prompt 59 from the prompt generator 48 requests a description of the item. The result of the first prompt 59 is shown as the generated text description 92. The second prompt 61 from the prompt generator 48 requests a value for each attribute. The result of the second prompt 61 is shown as the generated table 93.

Figure 10:
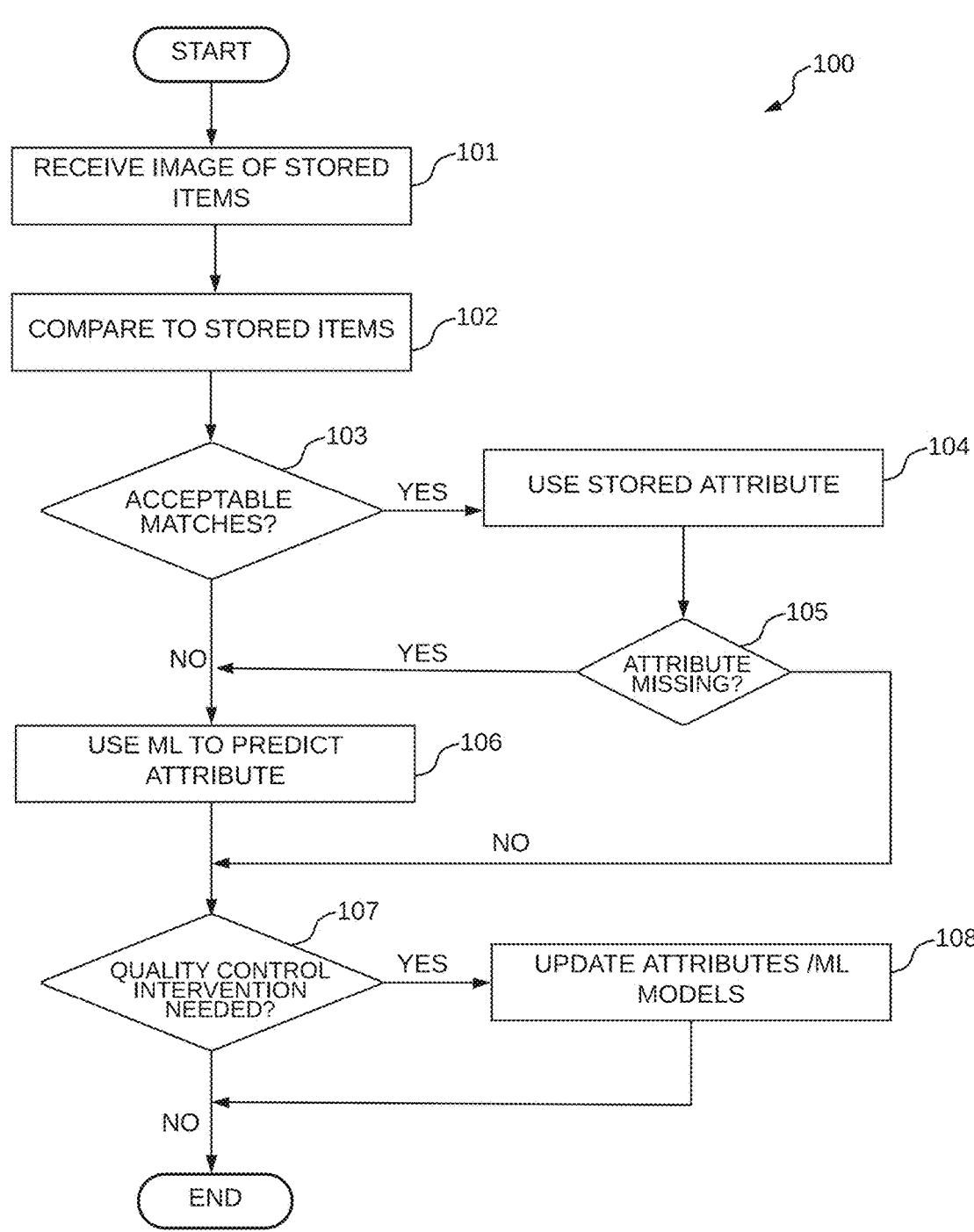
FIG. 10 is a diagram of a method performed by an attribute generator application.

FIG. 10 is a diagram of a method 100 for predicting attributes performed by an attribute generator application.

At step 101, an image of stored items is received.

At step 102, the received image is compared to stored item images.

At step 103, a determination is made as to whether the received image matches any of the stored images. If the received image matches any of the stored images, the method proceeds to step 104. If the received image does not match any of the stored images, the method proceeds to step 106.

At step 104, attributes of the matching stored images are associated with the item in the received image.

At step 105, a determination is made as to whether any attributes of the received item are missing after the attribute association performed at step 104. If there are attributes missing, the method proceeds to step 106. If there are no attributes missing, the method proceeds to step 107.

At step 106, a machine learning system operates to predict missing attributes.

At step 107, a determination is made as to whether quality control intervention is needed to adjust attribute information associated with the item. If quality control intervention is needed, the method proceeds to step 108. If no quality control intervention is needed, the method ends.

At step 108, as part of quality control intervention, attributes and/or ML models are updated to assign accurate attribute information to the item.

Thus, method 100 operates to generate attribute information for items in received images. It should be noted that the operations of method 100 are not limiting and that the operations can be rearranged, added to, deleted, or otherwise modified within the scope of the embodiments.

Figure 11:
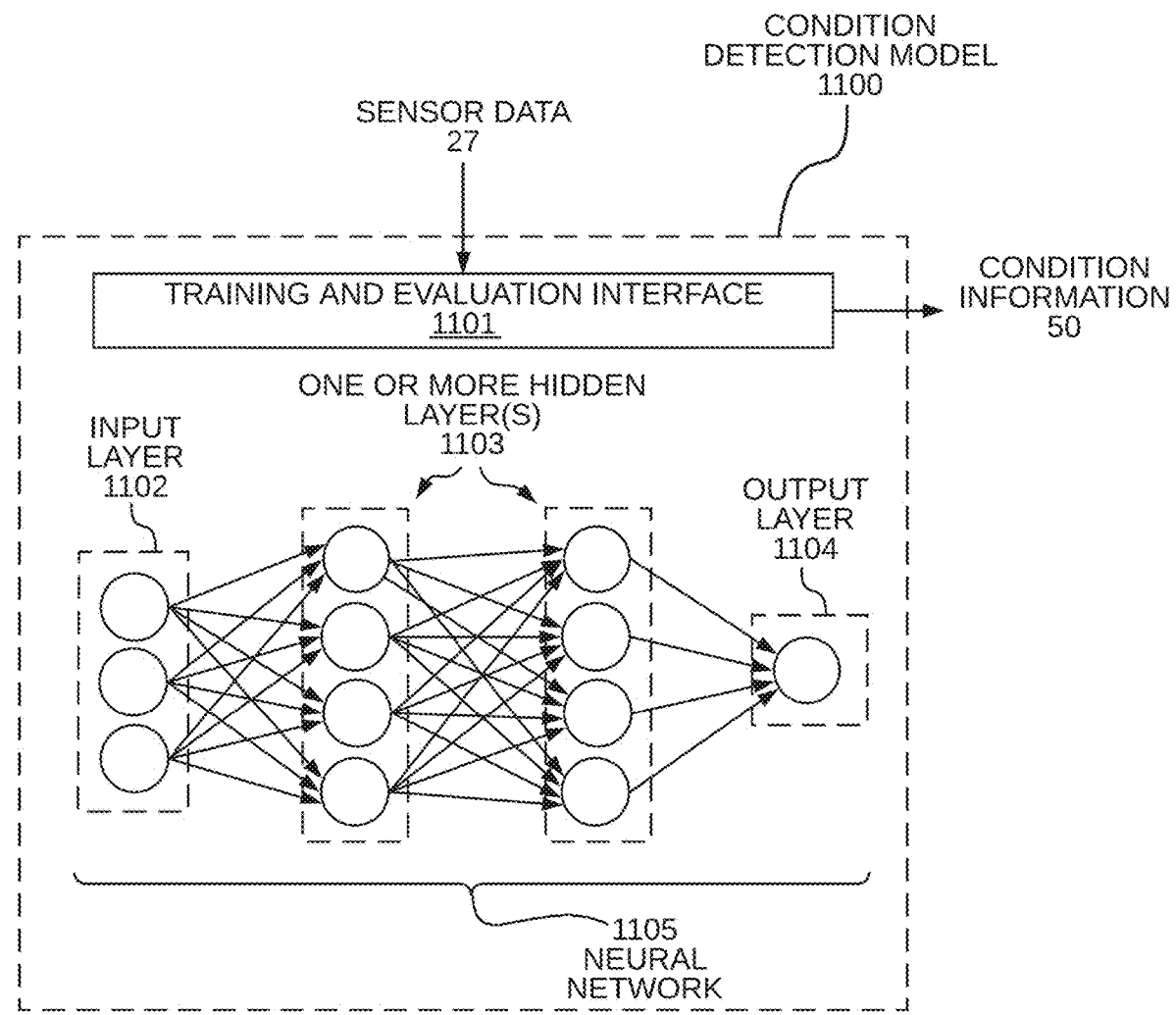
FIG. 11 shows a diagram of a condition detection model.

FIG. 11 shows a diagram of a condition detection model 1100. The model 1100 comprises a training and evaluation interface 1101 and a neural network 1105. The neural network 1105 comprises an input layer 1102, one or more intermediate layers 1103, and an output layer 1104. During operation, sensor data 27 is received and the neural network 1105 operates to generate condition information 50 from the received sensor data 27. In one embodiment, the training and evaluation interface 1101 is used to train the neural network 1105.

Figure 12:
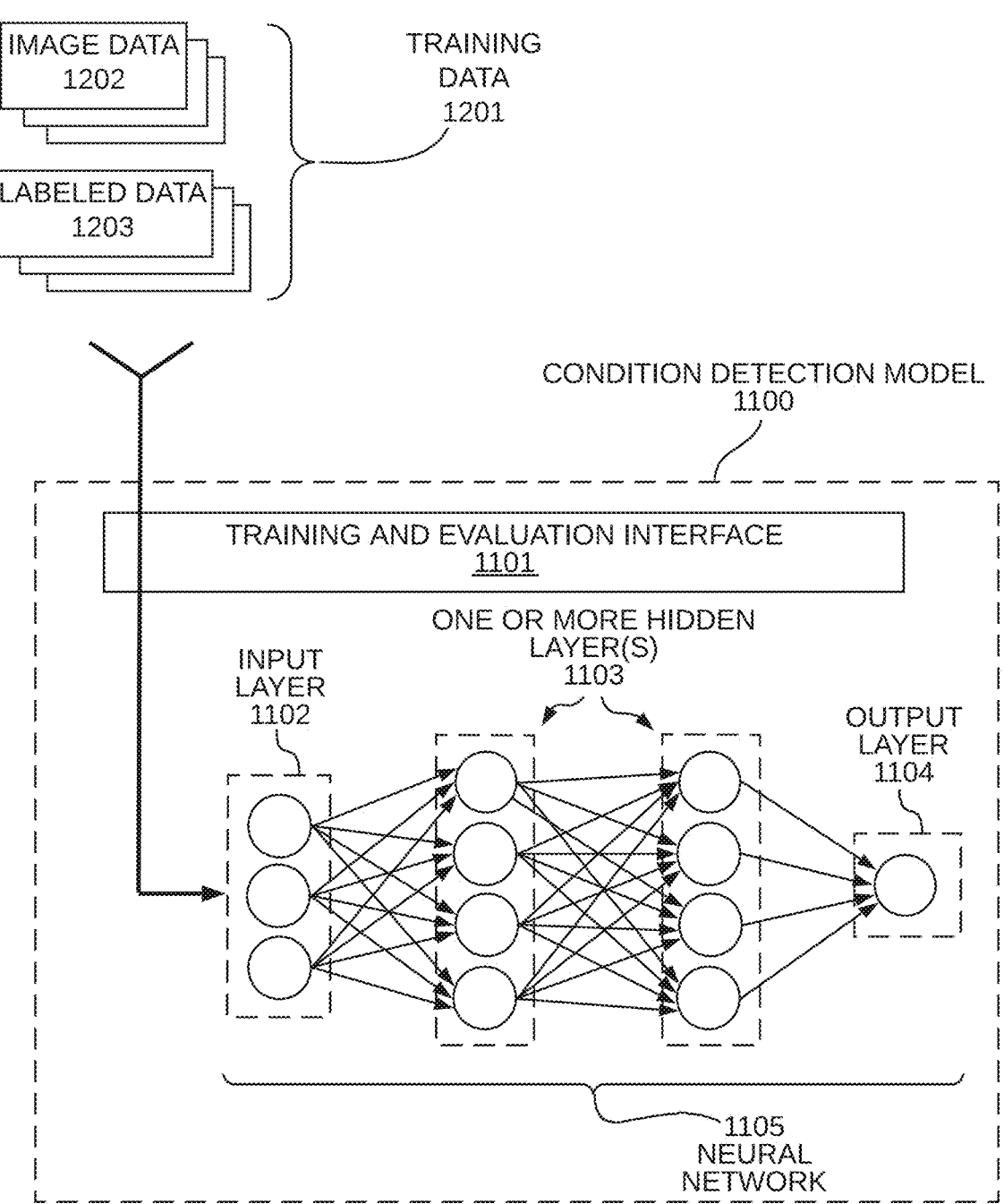
FIG. 12 shows a diagram illustrating training of the condition detection model shown in FIG. 11.

FIG. 12 shows a diagram illustrating training of the condition detection model shown in FIG. 11. During the training process, image data 1202 and labeled image data 1203 are input to the neural network 1105 using the training and evaluation interface 1101. The weights between the neural network layers are adjusted to reduce the error between the known defects in the training data and the detected defects identified by the neural network 1105.

Figure 13:
FIG. 13 shows examples of image data.

FIG. 13 shows examples of image data 1300. In one embodiment, the image data 1300 is suitable for use as the image data 1202 shown in FIG. 12. The image data 1300 is suitable for use in training the neural network 1105. In this example, the image data 1300 includes many images of soles of a shoe.

Figure 14:
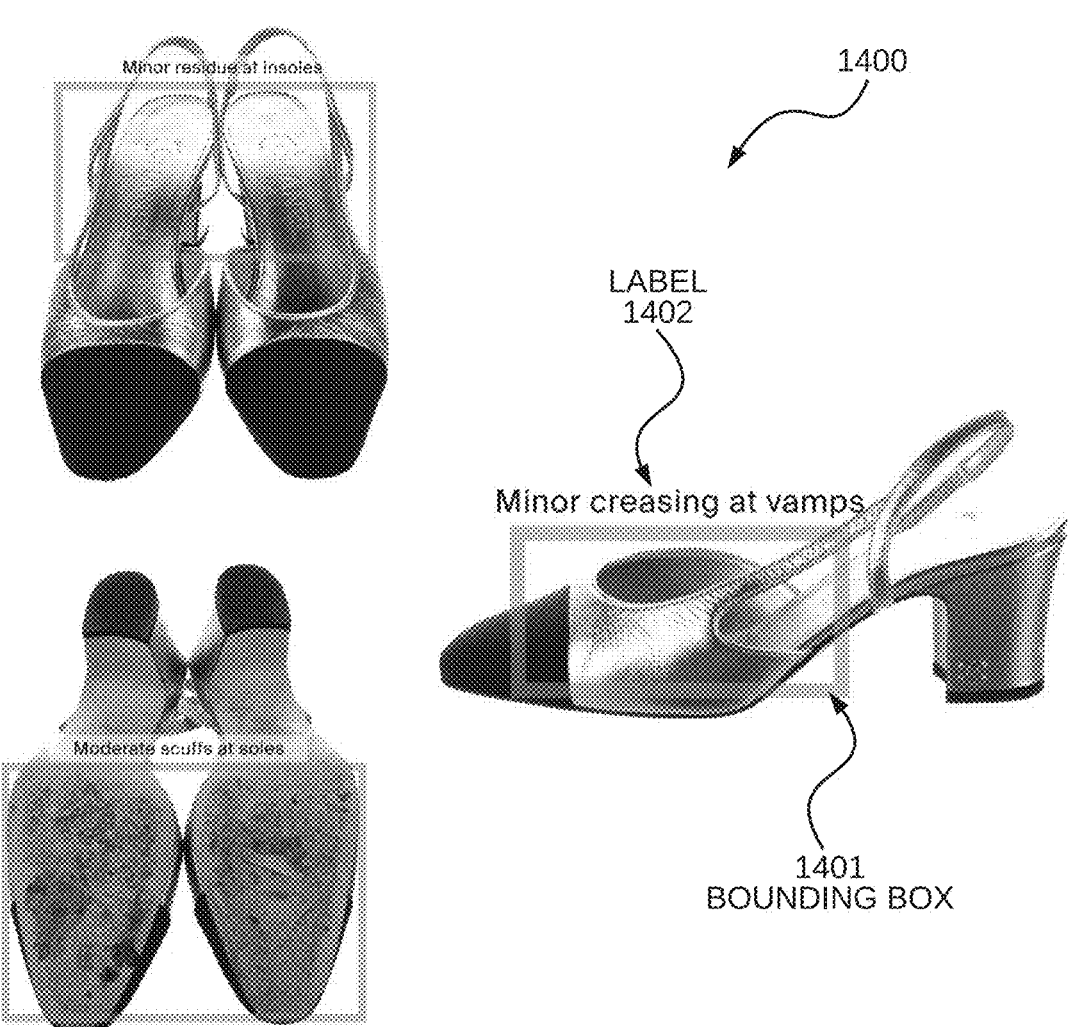
FIG. 14 shows examples of labeled image data.

FIG. 14 shows examples of labeled image data 1400. In one embodiment, the labeled image data 1400 is suitable for use as the labeled image data 1203 shown in FIG. 12. For example, the labeled image data includes a bounding box (e.g., bounding box 1401) that surrounds a defect in the item. The labeled image data also includes a label (e.g., label 1402) that describes the defect and a bounding box that surrounds the area with the defect. The labeled image data 1400 is suitable for use in training the neural network 1105.

In one embodiment, neural networks are also trained to categorize items based on overall condition. For example, categories such as "pristine" and "good" are attached to labeled image data. The trained neural networks are used to classify images of received items in such categories. Depending on item taxon, items are supplied to intake pipelines according to assigned condition categories.

Figure 15:
FIG. 15 shows additional examples of labeled image data.

FIG. 15 shows additional examples of labeled image data 1500. The labeled image data 1500 also is suitable for use in training the neural network 1105. Reference numeral 1501 identifies a bounding box. Bounding box 1501 identifies a vamp region of a shoe. The vamp region is an example of a high wear region. In various embodiments, neural networks are trained to detect high wear regions of items.

During operation, trained neural networks detect such high wear regions. After the high wear regions are detected, a user is instructed to capture additional images of the high wear regions. This ensures accurate and complete condition information is obtained. These additional images along with images of the item are presented to potential purchasers. As a result of having detailed and additional images of high wear regions, potential purchasers are able to understand wear and condition of items they are interested in purchasing with high precision. These additional images assist the provider entity 15 in accurately pricing items and in minimizing returns of such items.

Figure 16:
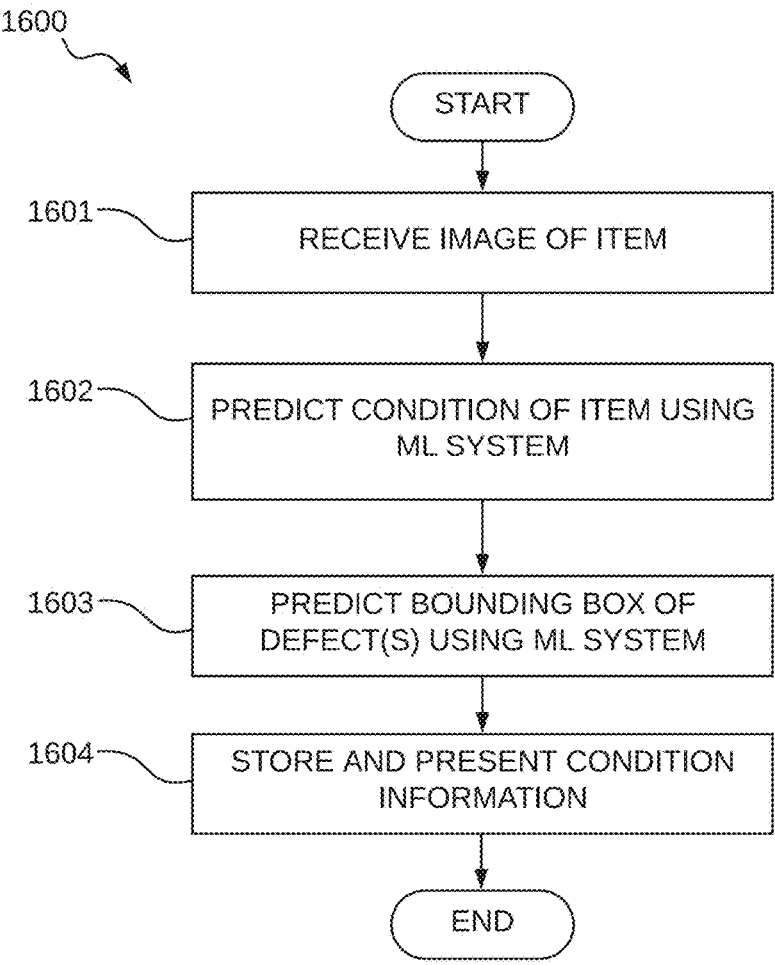
FIG. 16 is a diagram of a method performed by a condition detector application.

FIG. 16 is a diagram of a method 1600 for condition detection. In one embodiment, method 1600 is performed by the condition detection application 38.

At step 1601, an image of an item is received.

At step 1602, the condition of the received item is detected using a machine learning system.

At step 1603, bounding boxes are predicted that will bound defects of the item. In one embodiment, the bounding boxes are predicted by an ML system.

At step 1604, the predicted condition information is stored and also presented to a user.

Thus, method 1600 operates to generate condition information for items in received images. It should be noted that the operations of method 1600 are not limiting and that the operations can be rearranged, added to, deleted, or otherwise modified within the scope of the embodiments.

Figure 17:
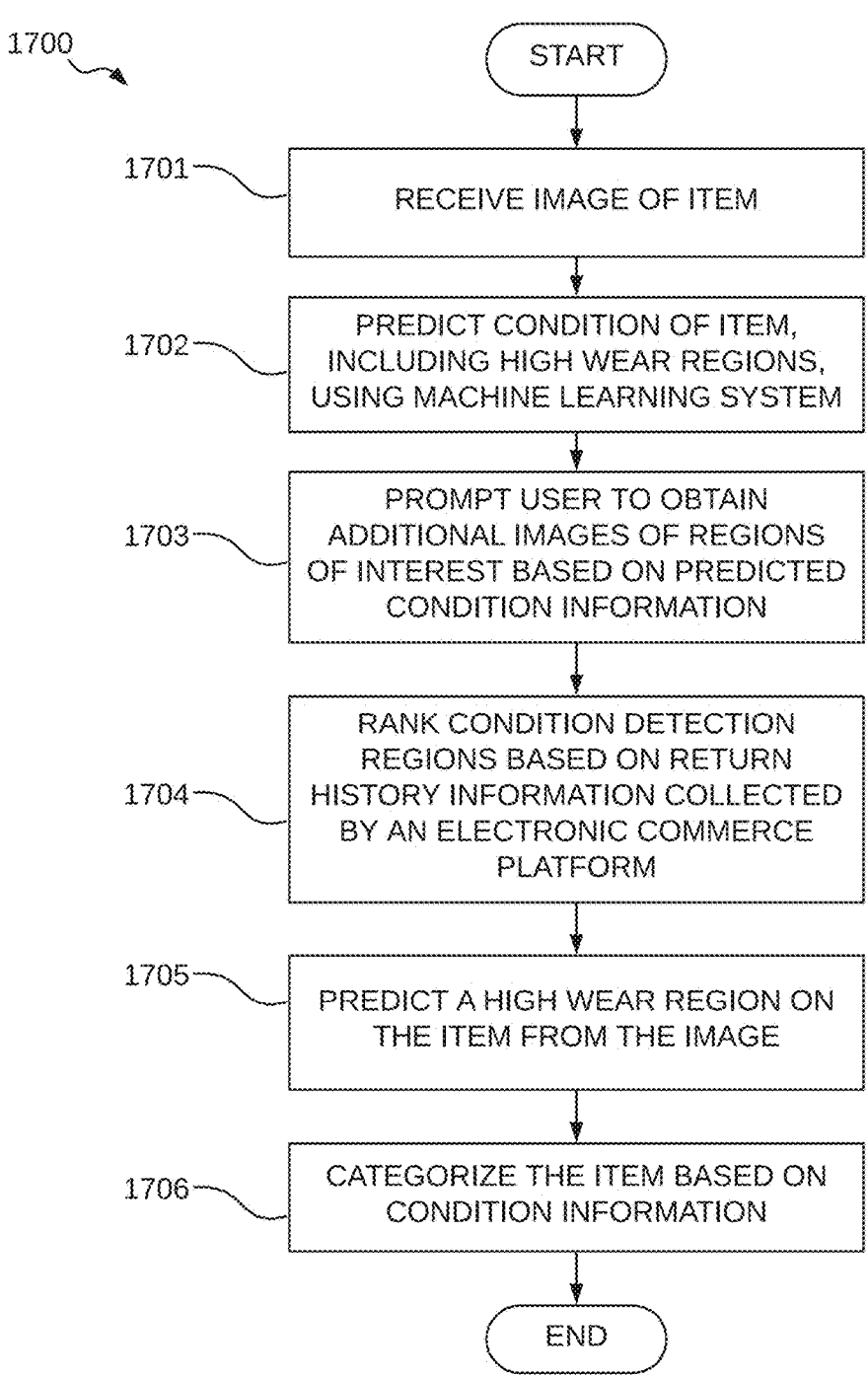
FIG. 17 is a diagram of a method for condition detection.

FIG. 17 is a diagram of a method 1700 for condition detection. In one embodiment, method 1700 is performed by the condition detection application 38.

At step 1701, an image of an item is received.

At step 1702, the condition of the received item is predicted using a machine learning system.

At step 1703, the user is prompted to obtain additional images of regions of interest based on the predicted condition information.

At step 1704, the condition detection regions are ranked based on return history information collected by an electronic commerce platform.

At step 1705, a high wear region on the item is predicted from the image and the condition information indicates a condition of the high wear region.

At step 1706, the item is categorized based on the condition information.

Thus, method 1700 operates to generate condition information for items in received images. It should be noted that the operations of method 1700 are not limiting and that the operations can be rearranged, added to, deleted, or otherwise modified within the scope of the embodiments.

Although certain specific embodiments are described above for instructional purposes, the teachings of this patent document have general applicability and are not limited to the specific embodiments described above. The electronic commerce server applications 18 and the storage system 20 are implemented using Google® Cloud Platform (GCP), Amazon® Web Services (AWS), or Microsoft® Azure cloud services, but it is appreciated that the electronic commerce server applications 18 and the storage system 18 may be implemented in many other ways using other platforms or techniques. Accordingly, various modifications, adaptations, and combinations of various features of the described embodiments can be practiced without departing from the scope of the invention as set forth in the claims.

What is claimed is:

1. A method comprising:
   receiving, at an application server over a network, an image of an item from a device comprising an image sensor;
   supplying the image to a vision encoder comprising a vision transformer and a querying transformer;
   generating a first prompt requesting a description of the item;
   supplying an output of the vision encoder and the first prompt to a first large language model (LLM) to generate a text description of the item;
   generating a second prompt requesting attribute values;
   supplying the text description and the second prompt to a second LLM to generate attribute information of the item;
   predicting condition information of the item from the image using a neural network trained to detect defects or wear regions;
   predicting a bounding box associated with the condition information, wherein the bounding box identifies at least one of a defect or a high wear region on the item; and
   ranking one or more condition detection regions based on return history information collected by an electronic commerce platform, wherein the return history information indicates items that were returned by buyers due to condition-related issues.

2. The method of claim 1, further comprising:
   prompting a user to obtain additional images of one or more regions of interest based on the predicted condition information.

3. The method of claim 1, further comprising:
   storing the predicted condition information and presenting the predicted condition information to a user.

4. The method of claim 1, wherein a single linear projection layer is disposed between the vision encoder and the first LLM.

5. The method of claim 1, wherein when a high wear region is identified, a user is instructed to capture additional images of the high wear region, and wherein the additional images are presented to potential purchasers.

6. The method of claim 1, further comprising:
   categorizing the item based on the condition information into a condition category.

7. The method of claim 1, wherein the neural network is trained using labeled image data that includes a bounding box surrounding a defect and a label describing the defect.

8. The method of claim 6, wherein the condition category comprises: pristine and good.

9. The method of claim 6, further comprising:
   supplying the item to an intake pipeline based on the assigned condition category.

10. The method of claim 1, wherein the ranking based on return history information assists in minimizing returns of items sold through the electronic commerce platform.

11. The method of claim 1, wherein the predicted condition information assists in generating a pricing estimate for the item.

* * * * *